(12) United States Patent
Sumanam

(10) Patent No.: US 8,026,301 B2
(45) Date of Patent: Sep. 27, 2011

(54) BIODEGRADABLE POLYMER COMPOSITION

(75) Inventor: Supreethi Sumanam, Hyerabad (IN)

(73) Assignee: BNT Force Biodegradable Polymers Pvt Ltd., Chennai (IN)

(*) Notice: Subject to any disclaimer, the term of this patent is extended or adjusted under 35 U.S.C. 154(b) by 128 days.

(21) Appl. No.: 12/299,360

(22) PCT Filed: Apr. 26, 2007

(86) PCT No.: PCT/IN2007/000165
§ 371 (c)(1),
(2), (4) Date: Jan. 9, 2009

(87) PCT Pub. No.: WO2007/125546
PCT Pub. Date: Nov. 8, 2007

(65) Prior Publication Data
US 2009/0163620 A1 Jun. 25, 2009

(30) Foreign Application Priority Data
May 1, 2006 (IN) ..................................... 787/2006

(51) Int. Cl.
*C08G 18/38* (2006.01)
*C08L 1/00* (2006.01)
*C08J 3/20* (2006.01)
*C08J 3/22* (2006.01)
*C12N 1/00* (2006.01)
*C12N 1/12* (2006.01)

(52) U.S. Cl. ..... 524/35; 523/351; 435/255.1; 435/257.1
(58) Field of Classification Search ............... 524/35; 435/255.1, 257.1; 523/351
See application file for complete search history.

(56) References Cited

U.S. PATENT DOCUMENTS

| | | | |
|---|---|---|---|
| 3,645,769 A * | 2/1972 | Willey et al. .................. 15/210.1 |
| 3,856,724 A * | 12/1974 | O'Connor et al. ............... 524/35 |
| 3,860,490 A * | 1/1975 | Guttag ............................ 435/182 |
| 3,867,324 A * | 2/1975 | Clendinning et al. ........ 523/126 |
| 3,901,838 A * | 8/1975 | Clendinning et al. ........ 523/126 |
| 3,907,726 A * | 9/1975 | Tomiyama ..................... 523/128 |
| 3,921,333 A * | 11/1975 | Clendinning et al. ............. 47/74 |
| 3,929,937 A * | 12/1975 | Clendinning et al. ........ 525/190 |
| 3,994,855 A * | 11/1976 | Boberg ........................... 523/126 |
| 4,156,666 A * | 5/1979 | Odate et al. .................... 523/125 |
| 4,921,803 A * | 5/1990 | Nohr ............................... 435/179 |
| 4,931,488 A * | 6/1990 | Chiquet ......................... 523/126 |
| 5,145,779 A * | 9/1992 | Pometto et al. ............... 435/262 |
| 5,166,232 A * | 11/1992 | Muller et al. .................... 524/35 |
| 5,212,219 A * | 5/1993 | Griffin ............................ 524/17 |
| 5,316,847 A * | 5/1994 | Suominen ...................... 428/327 |
| 5,346,929 A * | 9/1994 | Guttag ........................... 523/124 |
| 5,446,079 A * | 8/1995 | Buchanan et al. .............. 524/41 |
| 5,476,788 A * | 12/1995 | Lamar et al. ............... 435/262.5 |
| 5,532,298 A * | 7/1996 | Monroe et al. .................. 524/13 |
| 5,710,190 A * | 1/1998 | Jane et al. ...................... 521/102 |
| 5,814,404 A * | 9/1998 | Rutherford et al. ........... 428/364 |
| 6,060,584 A * | 5/2000 | Neely et al. ................... 528/501 |
| 6,090,195 A * | 7/2000 | Andersen et al. ........ 106/162.51 |
| 6,255,451 B1 * | 7/2001 | Koch et al. .................... 528/490 |
| 6,323,307 B1 * | 11/2001 | Bigg et al. ..................... 528/354 |
| 6,878,537 B2 * | 4/2005 | Oda et al. ...................... 435/255.1 |
| 2001/0027225 A1 * | 10/2001 | Downie ......................... 523/124 |
| 2002/0061583 A1 * | 5/2002 | Kawamura et al. ........ 435/255.1 |
| 2002/0123130 A1 * | 9/2002 | Cheung ....................... 435/262.5 |
| 2002/0123546 A1 * | 9/2002 | Bigg et al. ..................... 524/306 |
| 2002/0132884 A1 * | 9/2002 | Offerman ....................... 524/35 |
| 2003/0032170 A1 * | 2/2003 | Ito et al. ...................... 435/252.4 |
| 2004/0077248 A1 * | 4/2004 | Kurahashi et al. ............. 442/401 |
| 2004/0173779 A1 * | 9/2004 | Gencer et al. ................. 252/387 |
| 2005/0245638 A1 * | 11/2005 | Mezza ........................... 523/124 |
| 2006/0106120 A1 * | 5/2006 | Abe et al. ....................... 521/40 |
| 2007/0077630 A1 * | 4/2007 | Harris et al. ................... 435/105 |
| 2007/0161311 A1 * | 7/2007 | Zikeli et al. .................... 442/181 |
| 2007/0259995 A1 * | 11/2007 | Frenkel et al. .................. 524/35 |
| 2007/0270527 A1 * | 11/2007 | Horie et al. ..................... 524/77 |
| 2008/0021045 A1 * | 1/2008 | Gebauer et al. ............. 514/259.1 |

FOREIGN PATENT DOCUMENTS

JP          02058549 A    *  2/1990
WO        WO94/13737        6/1994

OTHER PUBLICATIONS

Bradley et al. Decomposition of Cellulose, 1926, p. 321-345.*

* cited by examiner

*Primary Examiner* — Mark Eashoo
*Assistant Examiner* — Liam J Heincer
(74) *Attorney, Agent, or Firm* — David H. Jaffer; Pillsbury Winthrop Shaw Pittman LLP

(57) ABSTRACT

The invention disclosed in this application relates to a novel biodegradable additive polymer composition useful for the preparation of biodegradable plastic products which comprises of a mixture of (i) a polymer selected from Polyethylene, polypropylene, poly styrene, poly vinyl chloride or a mixture thereof (ii) Cellulose (iii) Amides (iv) nutrients selected from Blue green algae and/or Yeast and (v) Water. This composition can be mixed with a virgin polymer to get a master polymer. The master batch composition may be mixed with a virgin polymer, which is useful for preparing products which are biodegradable.

13 Claims, No Drawings

BIODEGRADABLE POLYMER COMPOSITION

This application claims priority to International Application Serial Number PCT/IN2007/000165 filed Apr. 26, 2007, which claims the benefit of Indian Provisional Application Serial No. 787CHE2006 filed May 1, 2006.

INTRODUCTION

The present invention relates to a novel biodegradable additive polymer composition useful for the preparation of biodegradable plastic products and a process for the preparation of said composition. The present invention, more particularly, relates to a novel biodegradable additive polymer composition, which is useful for the preparation of a biodegradable master batch composition which in turn is useful for the preparation of a biodegradable polymer profile which is useful for the manufacture of biodegradable products such as Carrier bags, Garbage Disposal Bags, Hospital Disposables, Packaging Film and Thermoformed Plastics

BACKGROUND OF THE INVENTION

Biodegradable polymers began to provide a solution to the problem of Waste Management relating to Plastics from the 70's. Biodegradable polymer undergoes biodegradation when it is buried in the soil leaving no remains of the polymer or other toxic residues. The biodegradation or mineralization of the polymer is measured by the evolution of carbon-dioxide after microbial assimilation.

The term "biodegradable" had been used loosely in the early stages. Initial standards formulated for determining biodegradation actually amount to physical degradation only, on the basis of loss of tensile strength, discoloration and fragmentation. Many products claim biodegradability on the basis of these outdated standards, which have not been declared obsolete in the face of standards such as the ISO 14855 and the ASTM D 5338. Some materials, which merely disassemble or disintegrate into smaller pieces over time have been claimed to be "biodegradable" even though in reality they are not biodegradable in the strict sense of the word. A "biodegradable" polymer is capable of mineralizing completely on burial within a given period of time, leaving no traces of polymer in addition to a total absence of hazardous or toxic residue, unlike degradable polymer.

Over the course of the last many years there have been many patents in the area of biodegradable polymers/plastics. Yet none of these patents has led to products, which have been successful in establishing appreciable application in the overall plastics market due to the difference between biodegradable and degradable. The prior art has failed primarily in one or more of these four areas: 1) the articles lacked sufficient strength, 2) the articles had poor shelf life, 3) the articles were too expensive, and/or 4) processability into a useful article was difficult and expensive. The area where failure occurred most often was in price as some of the products manufactured from such biodegradable polymers cost as much as 5-20 times as much as non-biodegradable products available in the market. Another failing of these products is that they are photodegradable thus affecting the tensile strength of the product.

Starch-based polymers and other products merely disintegrate breaking up into minute particles not visible to the naked eye after burial resulting in biomass which may have toxic properties. They are also weak and too brittle by nature and have to be engineered to get the properties of virgin plastic. Another failing of starch-based products is that they lose strength under typical storage conditions through absorption of moisture, which leads to a weakening of the plastic.

There have been many attempts to make environmentally degradable articles using polymers. However, because of prohibitive costs, difficulty in processing, and lack of sufficient shelf life in end-use applications and have met with limited commercial success. Many compositions that have excellent degradability have only limited processability. Conversely, compositions, which are more easily processable, have reduced biodegradability.

To produce environmentally degradable polymers, attempts have been made to process aliphatic polymers made from natural starch on standard equipment and existing technology known in the plastic industry. Since natural starch generally has a granular structure, it needs to be "destructurized" before it can be melt processed into fine filaments. Modified starch (alone or as the major component of a blend) has been found to have poor melt extensibility, resulting in difficulty in successful production of fibers, films, foams or the like.

Biodegradation is measured by various Standards to test compostability to provide guidance to users. Certification from Standardized Test Procedures or tested norms, establish the credibility of the claims made regarding the biodegradability of the product and are necessary for the acceptance of polymer as biodegradable. International organizations responsible for establishing the validity of claims of Biodegradation have formulated Standards and Test Procedures which are internationally acceptable.

The International agencies for issue of the certificate for inherent biodegradability of plastic products are the following:

1) The American Society For Testing Materials (ASTM) in the United States,
2) Japan's GREENPLA program,
3) Europe's DIN certification and
4) European Committee for Standardization (CEN).

The above mentioned agencies/tests are relevant in that they establish the nature of the invention against the background of International acceptability since the product has been subjected to ASTM Testing procedures for Aerobic Degradation (ASTM D 5338 and ASTM 5209) (American Society for testing materials); both Tests are used to establish inherent biodegradability of the biodegradable polymer being tested.

PRIOR ART DETAILS

In most of the prior art, starch is used as a filler/binder which degrades when exposed to water, sunlight, heat and soil. Due to the biodegradable nature of starch, there have been many attempts to incorporate it into a variety of polymers. Starch has been incorporated into multi-component polymers in various forms, including as filler and binder.

In response to the demand for more environmentally friendly packaging materials, a number of new products which have been called "biopolymers" have been developed that have been shown to degrade when discarded into the environment. Some of the players in the biodegradable plastics market include well-known chemical companies as DuPont, BASF, Cargill-Dow Polymers, Union Carbide, Bayer, Monsanto, Mitsui and Eastman Chemical. Each of these companies has developed one or more classes or types of "biopolymers". For example, both BASF and Eastman Chemical have developed biopolymers known as "aliphatic-aromatic" copolymers, sold under the trade names ECOF- LEX and EASTAR BIO, respectively. Bayer has developed polyesteramides, under the trade name BAK. Du Pont has developed BIOMAX, a modified polyethylene terephthalate (PET). Cargill-Dow has sold a variety of biopolymers based on polylactic acid (PLA). Monsanto has developed a class of polymers known as polyhydroxyalkanoates (PHA), which include polyhydroxybutyrates (PHB), polyhydroxyvalerates (PHV), and polyhydroxybutyrate-hydroxyvalerate copolymers (PHBV). Union Carbide manufactures polycaprolactone (PCL) under the trade name TONE.

Each of the foregoing biopolymers has unique properties, benefits and weaknesses. For example, biopolymers such as BIOMAX, BAK, PHB and PLA tend to be strong but are also quite rigid or even brittle. This makes them poor candidates when flexible sheets or films are desired, such as for use in making wraps, bags and other packaging materials requiring good bend and folding capability. In the case of BIOMAX, DuPont does not presently provide specifications or conditions suitable for blowing films therefrom, thus indicating that it may not be presently believed that films can be blown from BIOMAX and similar polymers.

The Du Pont biodegradable polymer—BIO-PDO™ (a trade name) using starch from crops and plants was declared as the first biologically derived polymer. In general, the modified PET polymers of DuPont may be characterized as comprising alternating units of terephthalate and an aliphatic constituent, with the aliphatic constituent comprising a statistical distribution of two or more different aliphatic units derived from two or more different diols, such as ethylene glycol, diethylene glycol, triethylene oxide, polyethylene glycol, lower alkane diols, both branched and unbranched, and derivatives of the foregoing. A portion of the aliphatic units may also be derived from an aliphatic diacid, such as adipic acid. In addition, a fraction of the phenylene groups within the repeating terephthalate units may be sulfonated and neutralized with an alkali metal or alkaline earth metal base. Both the aliphatic portion of the modified PET polymer as well as the statistically significant quantity of sulfonated terephthalate units contribute significantly to the biodegradability of the BIOMAX polymer. Some BIOMAX grades of polymers have a melting point of 200-208.degree. C. and a glass transition temperature of 40-60.degree. BIOMAX allows the addition of Aliphatic Monomers which create weak spots in the polymer chain making the BIOMAX polymer hydro-degradable. Once moisture breaks the polymer into ingestible molecules, microbes can consume the material.

Applications of BIOMAX depend on the number of aliphatic monomers that are added, these can go to three aliphatic monomers to determine product application. Typical of the lacunae in the early standards defining biodegradability, though Du Pont's BIOMAX has claimed biodegradability, it has not met ASTM standards.

Biodegradable starch-based resins are available commercially from a number of manufacturers, such as Starchtech™ and Novamont™ Starchtech™ sells a series of such polymers under the "Re-NEW™" trade name. Novamont™ offers several classes of such polymers under the trade name, "Mater-Bi™."

In the Novamont biodegradable polymer PCT/EP1992/000959 and PCT/EP1992/000320 (they use starch that can originate from tubers, cereals or beans and may be maize, potato, tapioca, pea, or rice starch, etc. The compositions mentioned above are prepared by extrusion of the starch in mixture with the complexing thermoplastic polymer and, optionally, with a plasticizer under temperature and shear-force conditions such as to render the components of the mixture rheologically compatible or with a complexing agent.

Another Biodegradable polyetheresteramides P1 of BASF in PCT/EP1996/000458 which is obtained by reacting a mixture containing 20-95 mol % of adipic acid or ester-forming derivatives thereof or mixtures thereof and 5-80 mol % of terephthalic acid or ester-forming derivatives thereof or mixtures thereof, and (a2) a mixture of dihydroxy compounds (a21) from 15 to 99.3 mol % of a dihydroxy compound selected from the group consisting of C.sub.2-C.sub.6-alkanediols and C.sub.5-C.sub.10-cycloalkanediols, (a22) from 0.2 to 85 mol % of a dihydroxy compound containing ether functionalities of the formula I where n is 2, 3 or 4 and m is an integer from 2 to 250, or mixtures thereof and (a23) from 0.5 to 80 mol % of an amino-C.sub.2-C.sub.12-alkanol or amino-C.sub.5-C.sub.10-cycloalkanol, where the molar ratio of (a1) to (a2) is from 0.4:1 to 1.5:1, with the proviso, inter alia, that the polyetheresteramides P1 have a molecular weight (M.sub.n) in the range from 5000 to 80,000 g/mol, and biodegradable polymers, biodegradable moldings, and adhesives obtained from the disclosed polymers.

Bio-Products International in U.S. Pat. No. 5,252,271 discloses a material that is based on a dry starch composition.

Procter & Gamble Co (P & G), are the makers of aliphatic co polyester Nodax line of polymers that are biodegradable in aerobic and anaerobic conditions. Nodax polymers are produced by microorganisms through a fermentation process and plastic is extracted from the biomass (new cellular formation in the compost along with carbon-dioxide, water and mineral salts). The onset of degradation is bacterial and P&G have worked at end uses to ensure that the product performs well.

In U.S. Application No. 6,191,203, Monsanto Company has a Biodegradable polymer blend composition which contain oligomeric esters.

Mitsui Chemicals, Inc. manufactures a terpolymer that includes units derived from polylactide, polyglycolide and polycaprolactone that have been condensed together. Thus, this polymer is an aliphatic polymer and may be characterized as a PLA/PGA/PCL terpolymer. Three grade of this polymer are available, H100J, S100 and T100. The H100J grade PLA/PGA/PCL terpolymer has been analyzed to have a glass transition temperature of 74.degree. C. and a melting point of 173.degree. C.

Another method of producing a lactic acid-based polymer film, which comprises adding 19 to 49 parts by weight of a lactic acid-based polymer to 1 part by weight of a masterbatch lactic acid-based polymer composition to form a molding material, wherein the masterbatch lactic acid-based polymer composition comprises 100 parts by weight of a lactic acid-based polymer and 0.1 to 40 parts by weight of an antiblocking agent having an average particle diameter of 0.007 to 0.05 .mu.m and 10 parts by weight or less of a dispersing agent, and has a crystallinity of 10 to 60%, and forming the molding material into film at 150 to 230.degree. C. Another patent of Mitsui is a preparation process of aliphatic polyester having a weight average molecular weight of 15,000 or more by conducting a direct polycondensation reaction of an aliphatic polyhydric alcohol or a mixed aliphatic polyhydric alcohol and an aliphatic polybasic acid or a mixed aliphatic polybasic acid, or additionally a hydroxycarboxylic acid or a mixed hydroxycarboxylic acid or an oligomer of the hydroxycarboxylic acid in a reaction mixture containing an organic solvent. The aliphatic polyester thus obtained contains an extremely small amount of impurities, has low color and can exhibit satisfactory strength in the form of films, filaments and other shaped articles.

Bayer Corporation manufactures polyesteramides sold under the name BAK. Polyester amides manufactured by Bayer is prepared from adipic acid, 1,4-butanediol, and 6-aminocaproic acid. BAK 1095, a polyesteramide having an $M_n$ of 22,700 and an Mw of 69,700 and which contains aromatic constituents, has a melting point of 125.degree. C. BAK 2195 has a melting point of 175.degree. C. Although the glass transition temperatures of BAK 1095 and BAK 2195 are difficult to measure, because BAK appears to behave like a stiff polymer in the sense that improved properties may be obtained by blending BAK with a soft polymer, the inventors believe that the glass transition temperature of BAK polymers is essentially at least about 10.degree. C. For purposes of understanding the meaning and scope of the specification and claims, polyester amides such as BAK, as well as others that behave like BAK and can be used as a "stiff" polymer, shall be deemed to have a glass temperature of at least about 10.degree. C.

In U.S. patent application No. 5,292,783, another "soft" aliphatic-aromatic copolyester is manufactured by Eastman Chemical Company and is sold under the trade name EASTAR BIO. The aliphatic-aromatic copolyester manufactured by Eastman is a random copolymer derived from 1,4-butanediol, adipic acid, and dimethylterephthalate (DMT). One particular grade of EASTAR BIO, known as EASTAR BIO 14766, has a glass transition temperature of –33.degree. C. and a melting point of 112.degree. C. The phenol-containing compound is present in the biodegradable polymer at an amount sufficient to slow the degradation rate of the biodegradable polymer. The invention also pertains to a method for slowing the degradation rate of a biodegradable polymer.

Another related prior art is a non-toxic biodegradable plant protein composite, said composite comprising: 5 to 90 parts by weight soy protein; and 90 to 5 parts by weight of a polylactide, wherein said composite total does not exceed 100 parts and a method for making a biodegradable plant protein composite comprising: combining 5 to 90 parts by weight plant protein with 90 to 5 parts by weight polylactide to form a mixture; and extruding said mixture at a temperature sufficient to make the mixture extrudable; wherein said composite total does not exceed 100 parts The mechanism by which the presently available polymers are degraded typically involves the metabolic or digestive action of microbes or enzymes generally derived from those microbes breaking down the molecular structure or catalyzing the hydrolysis of the materials. The deliberate exposure of degradable materials to microbial or digestive conditions, such as in composting or mastication, brings about their relatively rapid degradation. Unfortunately, however, such materials are naturally susceptible to microbial action over their entire lifetime. Articles constructed from such biodegradable polymers therefore may support microbial growth long before they are degraded or otherwise consumed. Biodegradable materials often readily absorb water, which generally promotes microbial growth. This property may be a serious problem for materials requiring prolonged storage, especially if the storage environment is humid or otherwise encourages growth of fungi or bacteria which may be toxic (e.g., dark, poor ventilation, dirt, etc.). This is an especially serious problem for materials that are particularly intolerant of microbial proliferation, such as materials, which come into contact with food. Examples of the latter include plastic cutlery and tableware, plastic or paper/plastic composite cups, plastic or paper/plastic composite food containers, etc.

The main drawback of many of the above mentioned products are that they do not achieve the ISO 14855, ASTM D 5338 and ASTM 5209 standards set for certification and they are not economically viable. Polyethylene products used at least 10 years ago do not completely breakdown and remains in the environment. According to ASTM D 5338 & 14855 all that is put into compost must be assimilated ultimately if it is to be considered biodegradable.

There remains a need in the art to provide a fully compostable polymer that is strong, not prone to mold or pests, and can be readily and inexpensively made. Furthermore, there is a need to develop a robust method to prepare compostable products that can be used to hold dry, wet or damp material at a range of temperatures.

OBJECTIVES OF THE PRESENT INVENTION

The main objective of the present invention is to provide a novel biodegradable polymer composition, which is mainly based on natural environmentally friendly products which is useful for the preparation of biodegradable plastic products Another objective of the present invention is to provide a novel biodegradable polymer composition, useful for the preparation of biodegradable plastic products, which completely satisfies the mandatory requirements regarding biodegradability.

Still another objective of the present invention is to provide a novel biodegradable polymer composition, useful for the preparation of biodegradable plastic products which has the advantage of supporting plant life, and is therefore environmentally safe Yet another objective of the present invention is to provide novel biodegradable polymer composition useful for the preparation of biodegradable plastic products which does not leave any toxic substances or heavy metal residues in the soil nor emits toxic gases into the atmosphere, hence it is environmentally and animal safe and also of food grade quality.

Still another objective of the present invention is to provide a novel biodegradable master batch polymer composition incorporating the biodegradable polymer composition which in turn can be used for the preparation of biodegradable polymer composition which is useful for producing biodegradable products such as Carrier bags, Garbage Disposal Bags, Hospital Disposables, Packaging Film, thermoformed plastics etc at very competitive and affordable prices.

Yet another objective of the present invention is to provide a novel biodegradable polymer composition incorporating the biodegradable master batch polymer composition which in turn is can be used for the preparation of biodegradable products such as Carrier bags, Garbage Disposal Bags, Hospital Disposables, Packaging Film, thermoformed plastics etc at very competitive and affordable prices.

Another objective of the invention is a process for the preparation of novel biodegradable polymer composition, which does not require any special equipment for its preparation Still another objective of the present invention is to provide a process for the preparation of a novel biodegradable additive polymer composition which is simple and economical Still another objective of the present invention is to provide a process for the preparation of novel biodegradable master batch polymer composition incorporating the biodegradable additive polymer composition which in turn is useful for the preparation of a biodegradable polymer composition which can be directly used for the preparation of biodegradable products such as Carrier bags, Garbage Disposal Bags, Hospital Disposables, Packaging Film, thermoformed plastics etc at very competitive and affordable prices.

Yet another objective of the present invention is to provide a process for the preparation of novel biodegradable polymer composition incorporating the biodegradable master batch composition which can be added to the polymer profile of the preparation of biodegradable products such as Carrier bags, Garbage Disposal Bags, Hospital Disposables, Packaging Film, thermoformed plastics etc at very competitive and affordable prices.

The biodegradable polymeric compositions of the present invention have been developed based on nucleophilic substitution reaction. Carbonyl groups are particularly susceptible to nucleophilic attachment at carboxyl carbon due to the tendency of oxygen to acquire electrons even at the expense of gaining a negative charge, in addition to the relatively unhindered transition state leading from the trigonal reactant to the tetrahydral intermediates. The carboxyl group provide the site for nucleophilic attack in the polymer chain and also increases the number of hydrogens attached to the alpha carbon. Neucleophilic substitution takes place with the nascent Nitrogen, nascent Oxygen and nascent Hydrogen. Ions provided by the reactions taking place between an amide and water.

The above said nucleophilic substitution reaction takes place when a durable polymer (synthetic polymer) is mixed with agar & agar and/or yeast, cellulose, amides and water. The OH groups present in the Cellulose get attached to the OH groups of agar agar and yeast in a link resembling a glycoside linkage to the C-4 of the next. Consequently, the chain of the durable polymer which contains a number of weak C—C bonds, C—H bonds & H—H bonds are held together by the Hydrogen bonds between the numerous neighbouring OH groups present in the cellulose. This results in a weak polymer chain containing monomeric units making it susceptible for biodegradation.

Finally when the weakened polymer comes into contact with the soil, the monomeric units of the polymer act as nutrients to the bacteria present in the soil. Consequently, rapid biodegradation of the polymer takes place in the soil It is expected that the products made from the biodegradable polymer composition of the present invention, when buried in soil should convert to compost within a period of 6 to 36 months. This conclusion regarding conversion to compost is made on the basis that our tests in the laboratory have revealed that the composition biodegrades in a period of approximately six months to thirty six months as per ASTM D 5338 which also is an Aerobic Degradation Test by the Composting method.

SUMMARY OF THE INVENTION

Accordingly the present invention provides a novel biodegradable additive polymer composition useful for the preparation of biodegradable plastic products which comprises of a mixture of (i) a polymer selected from Polyethylene, polypropylene, poly styrene, poly vinyl chloride or a mixture thereof (ii) Cellulose (iii) Amides (iv) nutrients selected from Blue green algae and/or Yeast and (v) Water According to another embodiment of the present invention the amount of the polymer selected from Polyethylene, polypropylene, polystyrene, polyvinyl chloride or a mixture thereof used may be in the range from 90 to 99% by weight of the composition (ii) the amount of Cellulose used may be in the range from 0.35 to 3.50% by weight of the composition (iii) the amount of amides used may be in the range form 0.15 to 1.50% by weight of the composition (iv) the amount of nutrients selected from Blue green algae and/or Yeast used may be in the range from 0.30 to 3.0% by weight of the composition and (v) the amount of Water used may be in the range of 0.20 to 2.0% by weight of the composition According to an embodiment of the present invention the polyethylene used may be selected from LLDPE, LDPE and HDPE or mixtures thereof. The polymer used may be in the form of powders or granules In an embodiment of the invention the Cellulose used may be selected from plant cellulose, cottonseed extract, fibers of plants. The amount of Cellulose employed may preferably range from 1.62 to 2.80, more preferably 1.55 to 2.00 by weight of the composition In another embodiment of the present invention the amides used may be selected from nitrous salts like ammonium nitrate, potassium nitrate, calcium nitrate, sodium nitrate, combination of nitrides and nitrates. The amount of amides employed may preferably range from 1.00 to 1.20 more preferably 0.45 to 0.60% by weight of the composition In still another embodiment of the invention the Blue green algae used may be selected from deep blue algae, agar medium, green algae nutrition medium, agar extract, agar gel, agar proteins. The amount of Blue green algae employed may preferably range from range from 1.50 to 2.00 more preferably 1.30 to 1.45% by weight of the composition In an yet another embodiment of the present invention the yeast used may be selected from microbiological nutritional mediums, agar yeast medium, yeast extract, powdered dry and wet yeast, liquid yeast, yeast syrup, invertase, etc.

According to yet another embodiment of the present invention the composition may contain silica gel in an amount ranging from 0.15 to 0.18% by weight of the composition According to another embodiment of the present invention there is provided a process for the preparation of a novel biodegradable additive polymer composition as defined above useful for the preparation of biodegradable plastic products which comprises of mixing i) Polyethylene, polypropylene, poly styrene, polyvinyl chloride or a mixture thereof (ii) Cellulose (iii) Amides (iv) Blue green algae and/or Yeast and (v) Water at a temperature in the range of 25 to 100 degrees centigrade, keeping the resulting composition undisturbed for a period of 12 to 36 hours in order to complete the process of the polymer chain weakening into monomeric units.

According to another embodiment of the present invention there is provided a biodegradable master batch polymer composition which comprises the biodegradable additive polymer composition as described above and a polymer selected from Polyethylene, polypropylene, polystyrene, polyvinyl chloride or a mixture thereof, the selection being made depending upon the polymer used in the biodegradable additive polymer composition According to still another embodiment of the present invention there is provided a process for the preparation of biodegradable master batch composition which comprises mixing biodegradable additive polymer composition as described above and a polymer selected from Polyethylene, polypropylene, poly styrene, poly vinyl chloride or a mixture thereof, the selection being made depending upon the polymer used in the biodegradable additive polymer composition In a preferred embodiment of the present invention the amount of the biodegradable polymer composition used ranges from 30 to 60%, preferably from 35% to 45% by weight of the composition and the amount of the virgin polymer used ranges from 40 to 70%, preferably from 65% to 55% by weight of the composition According to yet another embodiment of the present invention there is provided a process for the preparation of biodegradable polymer composition which is directly useful for the manufacture of making end products such as Carrier bags, Garbage Disposal. Bags, Hospital Disposables, Packaging Film, thermoformed plastics which comprises mixing the biodegradable master batch polymer composition as described above with a polymer selected from Polyethylene, polypropylene, poly styrene, poly vinyl chloride or a mixture thereof, the selection being made depending upon the polymer used in the said additive polymer composition In an embodiment of the present invention the amount of the master batch polymer composition used may range from 2% to 10% preferably from 4.8 to 5% and the amount of the virgin polymer used may range from 98% to 90% by weight of the composition.

The polymer employed for mixing with the biodegradable master batch polymer composition may be those resulting from any down stream petrochemical complex.

The resulting biodegradable polymer composition can be converted into pellets or granules by any conventional method. The resulting pellets or granules can be used for the manufacture of biodegradable products such as Carrier bags, Garbage Disposal Bags, Hospital Disposables, and Packaging Film.

It is to be noted that the biodegradable compositions of the present invention is not a mere admixture of the ingredients used resulting in aggregation of their properties but a composition having synergistically enhanced properties to biodegrade quickly The details of the invention are given in the Examples, which are provided to illustrate the invention only and therefore should not be construed to limit the scope of the present invention

EXAMPLE 1

0.4375 mg of cellulose, 0.0625 mg of ammonium nitrate, 0.125 mg of agar-agar, 0.125 mg of yeast and 24.25 g of polyethylene powder are homogenously mixed with 5 ml of boiling water, maintained at 100 degree C. to form a slurry and keeping the resulting slurry undisturbed for 12 hours to get the biodegradable additive polymer composition.

The biodegradable additive polymer composition obtained as described above was mixed with 500 g of the soil (vermi compost+garden soil). The resulting soil was tested according to the ASTMD 5988-03 standards and the bio-degradation of the polymer composition was measured based on the amount of Co2 evolved. It was observed that 659 mg of Co 2 is evolved during a period of 45 days confirming that the polymer composition has undergone biodegradation

EXAMPLE 2

0.4375 mg of cellulose, 0.0625 mg of ammonium chloride, 0.125 mg of agar-agar, 0.125 mg of yeast and 24.25 g of polyethylene powder are homogenously mixed with 7 ml of water, maintained at 30 degree C. to form a slurry and keeping the resulting slurry undisturbed for 18 hours to get the biodegradable additive polymer composition.

The biodegradable additive polymer composition obtained as described above was mixed with 500 g of the soil (vermi compost+garden soil). The soil is tested according to the ASTMD 5988-03 standards and the rate of bio-degradation is measured from the amount of Co2 evolved. It was observed that 642 mg of Co 2 was evolved during a period of 45 days confirming that the polymer composition has undergone biodegradation

EXAMPLES 3

0.4375 mg of cellulose, 0.0625 mg of ammonium nitrate, 0.125 mg of silica gel, 0.125 mg of yeast and 24.25 g of polyethylene powder are homogenously mixed with 7.5 ml of boiling water, maintained at 48 degree C. to form a slurry and then cooled to room temperature and keeping the resulting slurry undisturbed for 18 hours to get the biodegradable additive polymer composition.

The biodegradable additive polymer composition obtained as described above was mixed with 500 g of the soil (vermi compost+garden soil). The soil is tested according to the ASTMD 5988-03 standards and the rate of biodegradation is measured from the amount of Co2 evolved. It was observed that 632 mg of Co 2 was evolved during a period of 45 days confirming that the polymer composition has undergone biodegradation

EXAMPLE 4

0.4375 mg of cellulose, 0.0625 mg of ammonium chloride, 0.125 mg of silica gel, 0.125 mg of yeast and 24.25 g of polyethylene powder are homogenously mixed with 6 ml of boiling water maintained at 51 degree C. to form a slurry and then cooled to room temperature and keeping the resulting slurry undisturbed for 20 hours to get the biodegradable additive polymer composition.

The biodegradable additive polymer composition obtained as described above was mixed with 500 g of the soil (vermi compost+garden soil). The soil was tested according to the ASTMD 5988-03 standard and the rate of biodegradation was measured from the amount of Co2 evolved. It was observed that 633 mg of Co 2 was evolved during a period of 45 days confirming that the polymer composition has undergone biodegradation

EXAMPLES 5

0.75 mg of cellulose, 0.0625 mg of ammonium nitrate, 0.125 mg of agar-agar, 0.0625 mg of yeast and 24.15 g of polyethylene powder are homogenously mixed with 9 ml of boiling water maintained at 72 Degree Cc to form a slurry and then cooled to room temperature and keeping the resulting slurry undisturbed for 16 hours to get the biodegradable additive polymer composition.

The biodegradable additive polymer composition obtained as described above was mixed with 500 g of the soil (vermin compost+garden soil). The soil was tested according to the ASTMD 5988-03 standards and the rate of bio-degradation was measured from the amount of Co2 evolved. It was observed that 596 mg of Co 2 was evolved during a period of 45 days confirming that the polymer composition has undergone biodegradation

EXAMPLES 6

0.25 mg of cellulose, 0.125 mg of ammonium chloride, 0.125 mg of agar-agar, 0.0625 mg of yeast and 24.43 g of polyethylene powder are homogenously mixed with 8.6 ml of boiling water maintained at 66 degree C. to form a slurry and then cooled to room temperature and keeping the resulting slurry undisturbed for 22 hours to get the biodegradable additive polymer composition. The biodegradable additive polymer composition obtained as described above was mixed with 500 g of the soil (vermin compost+garden soil). The soil was tested according to the ASTMD 5988-03 standards and the rate of bio-degradation was measured from the amount of Co2 evolved. It was observed that 524 mg of Co 2 was evolved during a period of 45 days confirming that the polymer composition has undergone biodegradation

EXAMPLES 7

0.3125 mg of cellulose, 0.0625 mg of ammonium nitrate, 0.0625 mg of agar-agar and 24.5625 g of polyethylene powder are homogenously mixed with 9.2 ml of boiling water, maintained at 54 degree C. to form a slurry and then cooled to room temperature and keeping the resulting slurry undisturbed for 21 hours to get the biodegradable additive polymer composition.

The biodegradable additive polymer composition obtained as described above was mixed with 500 g of the soil (vermin compost+garden soil). The soil is tested according to the ASTMD 5988-03 standards and the rate of bio-degradation was measured from the amount of Co2 evolved. It was observed that 553 mg of Co 2 was evolved during a period of 45 days confirming that the polymer composition has undergone biodegradation

EXAMPLES 8

0.375 mg of cellulose, 0.0625 mg of ammonium nitrate, 0.0625 mg of agar-agar and 24.488 g of polyethylene powder are mixed homogenously with 6.4 ml of boiling water maintained at 51 degree C. to form a slurry and then cooled to room temperature and keeping the resulting slurry undisturbed for 19 hours to get the biodegradable additive polymer composition.

The biodegradable additive polymer composition obtained as described above was mixed with 500 g of the soil (vermin compost+garden soil). The soil was tested according to the ASTMD 5988-03 standards and the rate of bio-degradation was measured from the amount of Co2 evolved. It was observed that 576 mg of Co 2 was evolved during a period of 45 days confirming that the polymer composition has undergone biodegradation

EXAMPLE 9

0.5 mg of cellulose, 0.125 mg of ammonium nitratr, 0.0875 mg of agar-agar, 0.0375 mg of yeast and 24.25 g of polypropylene granules are homogenously mixed with 9.9 ml of boiling water maintained at 60 degree C. to form a slurry and then cooled to room temperature and keeping the resulting slurry undisturbed for 24 hours to get the biodegradable additive polymer composition.

The biodegradable additive polymer composition obtained as described above was mixed with 500 g of the soil (vermin compost+garden soil). The soil was tested according to the ASTMD 5988-03 standards and the rate of biodegradation was measured from the amount of Co2 evolved. It was observed that 513 mg of Co 2 was evolved during a period of 45 days confirming that the polymer composition has undergone biodegradation

EXAMPLE 10

0.625 mg of cellulose, 0.125 mg of ammonium nitrate 0.25 mg of agar-agar 0.0625 mg of yeast and 23.9375 g of polystyrene granules are homogenously mixed with 10.6 ml of boiling water maintained at 49 degree C. to form a slurry and then cooled to room temperature and keeping the resulting slurry undisturbed for 26 hours to get the biodegradable additive polymer composition.

The biodegradable additive polymer composition obtained as described above was mixed with 500 g of the soil (vermi compost+garden soil). The soil is tested according to the ASTMD 5988-03 standards and the rate of bio-degradation was measured from the amount of Co2 evolved. It was observed that 751 mg of CO 2 is evolved during a period of 45 days confirming that the polymer composition has undergone biodegradation

EXAMPLE 11

0.6875 mg of cellulose 0.0375 mg of ammonium chloride 0.3125 mg of agar-agar, 0.025 mg of yeast and 23.9375 g of polypropylene granules are homogenously mixed with 10 ml of water maintained at 63 degree C. to form a slurry and then cooled to room temperature and keeping the resulting slurry undisturbed for 27 hours to get the biodegradable additive polymer composition.

The biodegradable additive polymer composition obtained as described above was mixed with 500 g of the soil (vermin-compost+garden soil). The soil was tested according to the ASTMD 5988-03 standards and the rate of bio-degradation was measured from the amount of Co2 evolved. It was observed that 590 mg of Co 2 was evolved during a period of 45 days confirming that the polymer composition has undergone biodegradation

EXAMPLE 12

0.375 mg of cellulose 0.1125 mg of ammonium nitrate, 0.075 mg of agar-agar, 0.0375 mg of yeast and 24.4 g of polystyrene are homogenously mixed with 12.9 ml of boiling water, maintained at 78 degree C. to form a slurry and then cooled to room temperature and keeping the resulting slurry undisturbed for 32 hours to get the biodegradable additive polymer composition.

The biodegradable additive polymer composition obtained as described above was mixed with 500 g of the soil (vermin compost+garden soil). The soil was tested according to the ASTMD 5988-03 standards and the rate of bio-degradation is measured from the amount of CO2 evolved. It was observed that 507 mg of CO 2 was evolved during a period of 45 days confirming that the polymer composition has undergone biodegradation

EXAMPLE 13

0.375 mg of cellulose 0.0375 mg of ammonium nitrate 0.3 mg of agar-agar and 24.1625 g of polypropylene granules are homogenously mixed with 16.4 ml of boiling water maintained at 86 degree C. to form a slurry and then cooled to room temperature and keeping the resulting slurry undisturbed for 36 hours to get the biodegradable additive polymer composition.

The biodegradable additive polymer composition obtained as described above was mixed with 500 g of the soil (vermi-compost+garden soil). The soil was tested according to the ASTMD 5988-03 standards and the rate of bio-degradation was measured from the amount of CO2 evolved. It was observed that 519 mg of CO2 was evolved during a period of 45 days confirming that the polymer composition has undergone biodegradation

EXAMPLE 14

0.4375 mg of cellulose, 0.1125 mg of ammonium nitrate, 0.1875 mg of agar-agar and 24.262 g of polystyrene powder are homogenously mixed with 17.2 ml of boiling water maintained at 96 degree C. toから a slurry and then cooled to room temperature and keeping the resulting slurry undisturbed for 30 hours to get the biodegradable additive polymer composition.

The biodegradable additive polymer composition obtained as described above was mixed with 500 g of the soil (vermin-compost+garden soil). The soil was tested according to the ASTMD 5988-03 standards and the rate of biodegradation was measured from the amount of $CO_2$ It was observed that 556 mg of $CO_2$ was evolved during a period of 45 days confirming that the polymer composition has undergone biodegradation

EXAMPLE 15

0.5 mg of cellulose 0.0625 mg of ammonium nitrate 0.1875 mg agar-agar and 24.2125 g polyethylene powder are homogenously mixed with 19.3 ml of water maintained at 100 degree C. to form a slurry and then cooled to room temperature and keeping the resulting slurry undisturbed for 28 hours to get the biodegradable additive polymer composition.

The biodegradable additive polymer composition obtained as described above was mixed with 500 g of the soil (vermin compost+garden soil). The soil was tested according to the ASTMD 5988-03 standards and the rate of bio-degradation is measured from the amount of $co_2$ evolved. It was observed that 726 mg of $CO_2$ was evolved during a period of 45 days confirming that the polymer composition has undergone biodegradation

EXAMPLE 16

0.5625 mg of cellulose 0.0625 mg of ammonium nitrate 0.1875 mg of agar-agar, 0.0625 mg of ammonium chloride and 24.1 g of polyvinyl chloride are homogenously mixed with 20 ml of water, maintained at 90 degree C. to form a slurry and then cooled to room temperature and keeping the resulting slurry undisturbed for 31 hours to get the biodegradable additive polymer composition.

The biodegradable additive polymer composition obtained as described above was mixed with 500 g of the soil (vermin-compost+garden soil). The soil was tested according to the ASTMD 5988-03 standards and the rate of bio-degradation was measured from the amount of $co_2$ evolved. It was observed that 594 mg of $Co_2$ was evolved during a period of 45 days, confirming that the polymer composition has undergone biodegradation

EXAMPLE 17

0.6875 mg of cellulose, 0.0375 mg of ammonium nitrate, 0.3125 mg agar-agar and 23.9375 g of polyethylene powder are homogenously mixed with 18.7 ml of water maintained at 89 degree C. to form a slurry and then cooled to room temperature and keeping the resulting slurry undisturbed for 34 hours to get the biodegradable additive polymer composition.

The biodegradable additive polymer composition obtained as described above was mixed with 500 g of the soil (vermin-compost+garden soil). The soil is tested according to the ASTMD 5988-03 standards and the rate of bio-degradation was measured from the amount of $CO_2$ evolved. It was observed that 636 mg of $CO_2$ was evolved during a period of 45 days confirming that the polymer composition has undergone biodegradation

EXAMPLE 18

0.75 mg of cellulose 0.375 mg of ammonium nitrate 0.075 mg of agar-agar and 23.75 g of polyethylene powder are homogenously mixed with 15.4 ml of water, maintained at 93 degree C. to form a slurry and keeping the resulting slurry undisturbed for 29 hours to get the biodegradable additive polymer composition.

The biodegradable additive polymer composition obtained as described above was mixed with 500 g of the soil (vermin-compost+garden-soil). The soil is tested according to the ASTMD 5988-03 standards and the rate of biodegradation is measured from the amount of $CO_2$ evolved. It was observed that 576 mg of $CO_2$ was evolved during a period of 45 days confirming that the polymer composition has undergone biodegradation

EXAMPLE 19

0.75 mg of cellulose 0.375 mg of ammonium nitrate 0.075 mg of agar-agar and 5.9 gms each of the powders of Polyethylene, polypropylene, polystyrene, polyvinyl chloride are homogenously mixed with 15.4 ml of water, maintained at 93 degree C. to form a slurry and keeping the resulting slurry undisturbed for 36 hours to get the biodegradable additive polymer composition.

The biodegradable additive polymer composition obtained as described above was mixed with 500 g of the soil (vermin-compost+garden-soil). The soil is tested according to the ASTMD 5988-03 standards and the rate of biodegradation is measured from the amount of $CO_2$ evolved. It was observed that 832 mg of $CO_2$ was evolved during a period of 45 days confirming that the polymer composition has undergone biodegradation

EXAMPLE 20

300 grams of the composition prepared by the process described in Example 1 was mixed thoroughly with 700 gms of polyethylene at room temperature. The resulting mixture was extruded co rotating twin-screw extruder to get strands, which were cut, into pellets having an average size of 3 mm to get master batch composition in the form Of pellets

EXAMPLE 21

280 grams of the composition prepared by the process described in Example 11 was mixed thoroughly with 720 gms of polypropylene at room temperature. The resulting mixture is extruded co rotating twin-screw extruder to get strands, which were cut, into pellets having an average size of 3 mm. To get the master batch composition in the form of pellets

EXAMPLE 22

510 grams of the composition prepared by the process described in Example 14 was mixed thoroughly with 490 gms of polystyrene at room temperature. The resulting mixture is extruded co rotating twin screw extruder to get strands which were cut into pellets having an average size of 3 mm. To get the master batch composition in the form of pellets

EXAMPLE 23

200 grams of the additive composition prepared by the process described in Example 19 was mixed thoroughly with 200 gms each of the granules of polyethylene, polypropylene polystyrene and poly vinyl chloride at room temperature. The resulting mixture is extruded through a co rotating twin-screw extruder to get strands, which were cut, into pellets having an average size of 3 mm. To get the master batch composition in the form of pellets

EXAMPLE 24

30 grams of the master batch composition prepared by the process described in Example 20 was mixed thoroughly with 970 gms of polyethylene at room temperature. The resulting mixture was extruded through film extruder to get films The films can, be converted into suitable end products which are biodegradable by conventional methods

EXAMPLE 25

50 grams of the master batch composition prepared by the process described in Example 21 was mixed thoroughly with 950 gms of polypropylene at room temperature. The resulting mixture is extruded through a sheet extruder to get sheets. The sheets can be converted into suitable end products, which are biodegradable, by conventional methods

EXAMPLE 26

100 grams of the composition prepared by the process described in Example 22 was mixed thoroughly with 900 gms of polystyrene at room temperature e. The resulting mixture is extruded through a sheet extruder to get sheets. The sheets can be converted into suitable end products which are biodegradable by conventional methods

EXAMPLE 27

10 grams of the composition prepared by the process described in Example 22 was mixed thoroughly with 247.50 gms each of the granules of polyethylene, polypropylene, polystyrene and poly vinyl chloride at room temperature e. The resulting mixture is extruded through a sheet extruder to get sheets. The sheets can be converted into suitable end products, which are biodegradable, by conventional methods

ADVANTAGES OF THE PRESENT INVENTION

- The novel biodegradable polymer composition bio degrades quickly say within six to thirty six months
- The novel biodegradable polymer composition satisfies the requirements of biodegradability
- The novel biodegradable polymer composition can be mixed directly with virgin polymers for making end products such as Carrier bags, Garbage Disposal Bags, Hospital Disposables, Packaging Film, thermoformed plastics
- The products made from the novel biodegradable polymer composition does not leave any toxic substances in the soil nor emits toxic gases into the atmosphere, hence it is environmentally, animal and food safe
- The products made from the novel biodegradable polymer composition do not alter the PH value of the soil.
- The products made from the novel biodegradable polymer composition is made up of simple organic constituents which contain no metals and therefore do not also leave behind any metals in the soil at the time of biodegradation.
- The process for the preparation of novel biodegradable polymer composition is simple and economical

The invention claimed is:

1. A biodegradable polymer composition comprising a mixture of (i) a polymer selected from the group consisting of polyethylene, polypropylene, polystyrene, and polyvinyl chloride, (ii) cellulose, (iii) a nitrogen-containing compound, (iv) a nutrient selected from the group consisting of blue-green algae and yeast, and (v) water, wherein the amount of the polymer used is in the range from 90 to 99% by weight of the composition, the amount of cellulose used is in the range from 0.35 to 3.50% by weight of the composition, the amount of nitrogen-containing compound used is in the range from 0.15 to 1.50% by weight of the composition, the amount of nutrient used is in the range from 0.30 to 3.0% by weight of the composition, and the amount of water used is in the range of 0.20 to 2.0% by weight of the composition.

2. The composition of claim 1 wherein the polymer used is in the form of powders or granules.

3. The composition of claim 1 wherein the cellulose is selected from the group consisting of plant cellulose, cotton seed extract, and fibers of plants, and the amount ranges from 1.55 to 2.80% by weight of the composition.

4. The composition of claim 1 wherein the nitrogen-containing compound is a salt selected from the group consisting of ammonium salts, amides, ammonium nitrate, potassium nitrate, calcium nitrate, and sodium nitrate, and the amount of nitrogen-containing compound ranges from 0.45 to 1.20% by weight of the composition.

5. The composition of claim 1 wherein the blue-green algae is selected from the group consisting of deep blue algae, agar medium, green algae nutrition medium, agar extract, agar gel, and agar proteins, and the amount ranges from 1.30 to 2.00% by weight of the composition.

6. The composition of claim 1 wherein the yeast is selected from the group consisting of microbiological nutritional mediums, agar yeast medium, yeast extract, powdered dry, wet yeast, liquid yeast, yeast syrup, and invertase.

7. The composition of claim 1 wherein the composition contains silica gel in an amount ranging from 0.15 to 0.18% by weight of the composition.

8. A biodegradable master batch polymer composition comprising the composition of claim 1 and a virgin polymer selected from the group consisting of polyethylene, polypropylene, polystyrene, and polyvinyl chloride.

9. A process for preparing a biodegradable polymer composition comprising the steps of:
  (a) mixing (i) a polymer selected from the group consisting of polyethylene, polypropylene, polystyrene, and polyvinyl chloride, (ii) cellulose, (iii) a nitrogen-containing compound, (iv) a nutrient selected from the group consisting of blue-green algae and yeast, and (v) water, at a temperature in the range of 25 to 100 degrees centigrade, wherein the amount of the polymer used is in the range from 90 to 99% by weight of the composition, the amount of cellulose used is in the range from 0.35 to 3.50% by weight of the composition, the amount of nitrogen-containing compound used is in the range from 0.15 to 1.50% by weight of the composition, the amount of nutrient used is in the range from 0.30 to 3.0% by weight of the composition, and the amount of water used is in the range of 0.20 to 2.0% by weight of the composition; and
  (b) keeping the resulting mixture undisturbed for a period of 12 to 36 hours.

10. A process for the preparation of a biodegradable master batch polymer composition comprising mixing a biodegradable polymer composition comprising a mixture of (i) a polymer selected from the group consisting of polyethylene, polypropylene, polystyrene, and polyvinyl chloride, (ii) cellulose, (iii) a nitrogen-containing compound, (iv) a nutrient selected from the group consisting of blue-green algae and yeast, and (v) water, wherein the amount of the polymer used is in the range from 90 to 99% by weight of the composition, the amount of cellulose used is in the range from 0.35 to 3.50% by weight of the composition, the amount of nitrogen-containing compound used is in the range from 0.15 to 1.50% by weight of the composition, the amount of nutrient used is in the range from 0.30 to 3.0% by weight of the composition, and the amount of water used is in the range of 0.20 to 2.0% by weight of the composition, with a virgin polymer selected from the group consisting of polyethylene, polypropylene, polystyrene, and polyvinyl chloride.

11. The process of claim 10 wherein the amount of the biodegradable polymer composition used ranges from 30 to 60%, by weight of the composition, and the amount of the virgin polymer used ranges from 40 to 70% by weight of the composition.

12. The process of claim 11, further comprising the step of manufacturing an end product selected from the group consisting of carrier bags, garbage disposal bags, hospital disposables, packaging film, and thermoformed plastics.

13. The process of claim 10, wherein the amount of the biodegradable polymer composition used ranges from 2% to 10% by weight and the amount of the virgin polymer used ranges from 98% to 90% by weight of the composition.

\* \* \* \* \*